No. 785,275. PATENTED MAR. 21, 1905.
J. T. S. SCHOUBOE.
SELF LOADING SMALL ARMS.
APPLICATION FILED JUNE 25, 1901.
5 SHEETS—SHEET 1.
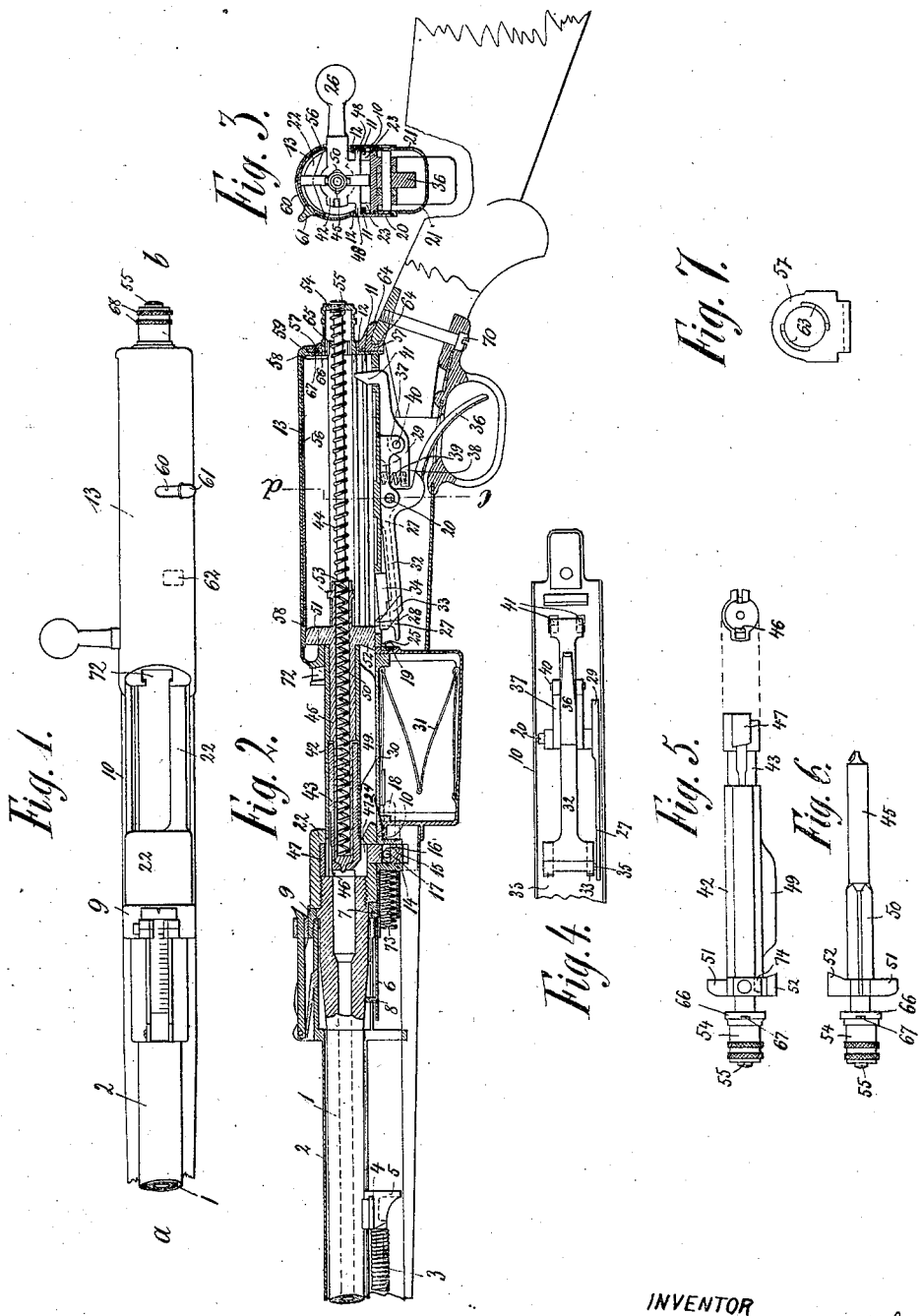
WITNESSES:
INVENTOR
Jens Theodor Suhr Schouboe
BY
Richards
ATTORNEYS.

No. 785,275. PATENTED MAR. 21, 1905.
J. T. S. SCHOUBOE.
SELF LOADING SMALL ARMS.
APPLICATION FILED JUNE 25, 1901.
5 SHEETS—SHEET 2.
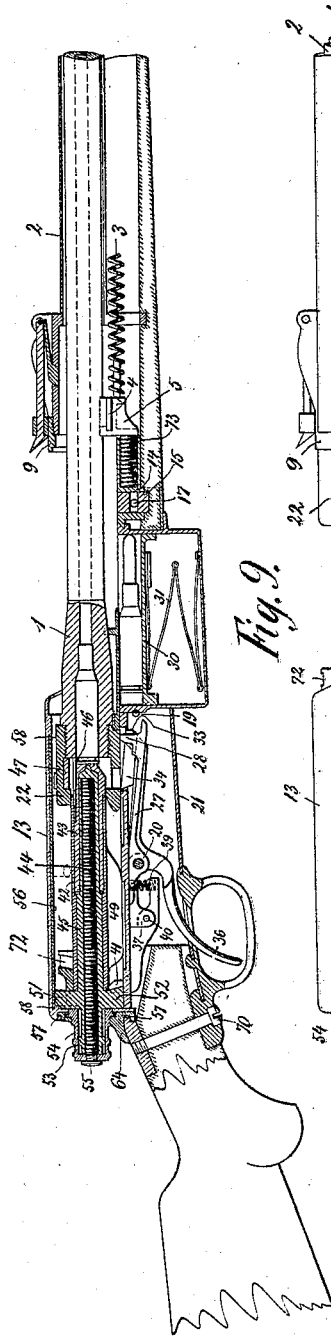
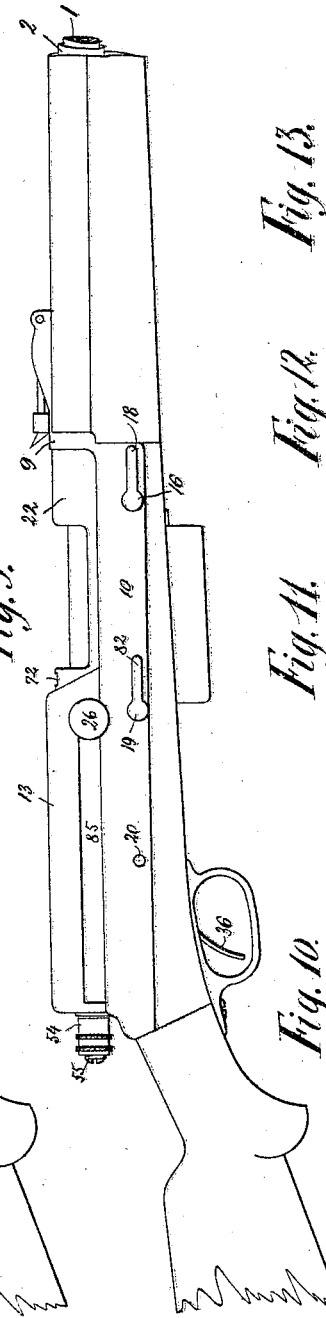
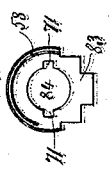
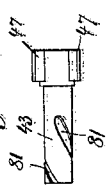
WITNESSES:
INVENTOR
Jens Theodor Suhr Schouboe
BY Richardson
ATTORNEYS.

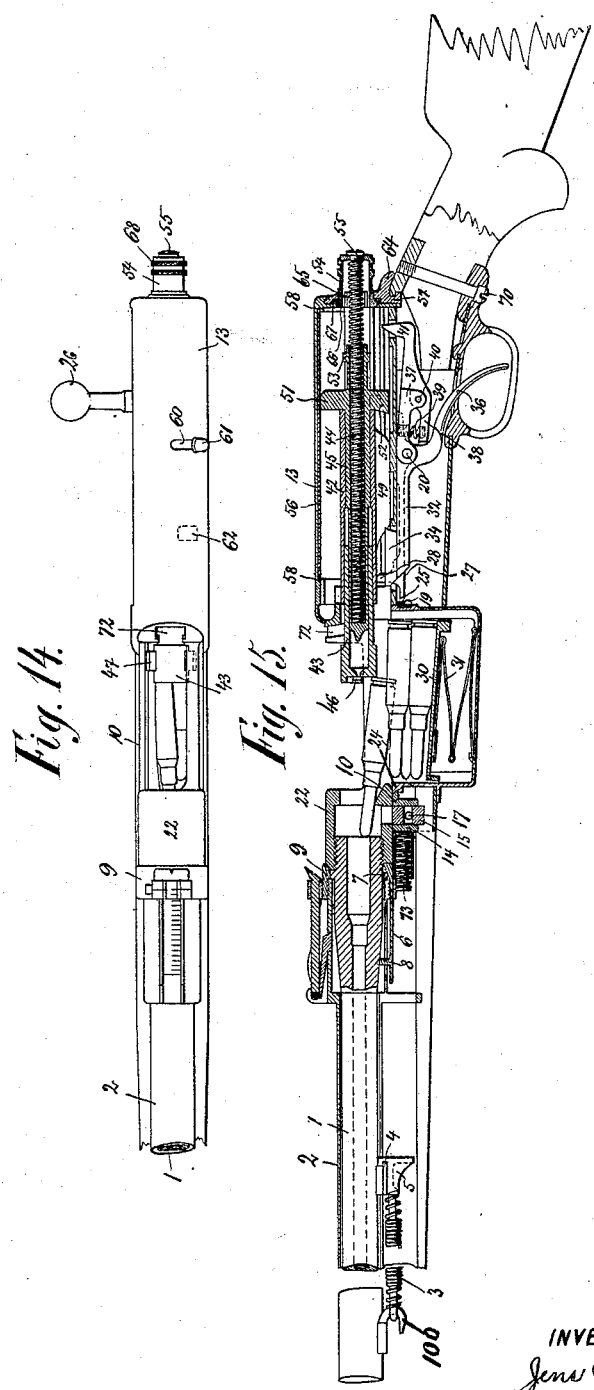

No. 785,275. PATENTED MAR. 21, 1905.
J. T. S. SCHOUBOE.
SELF LOADING SMALL ARMS.
APPLICATION FILED JUNE 25, 1901.
5 SHEETS—SHEET 4.
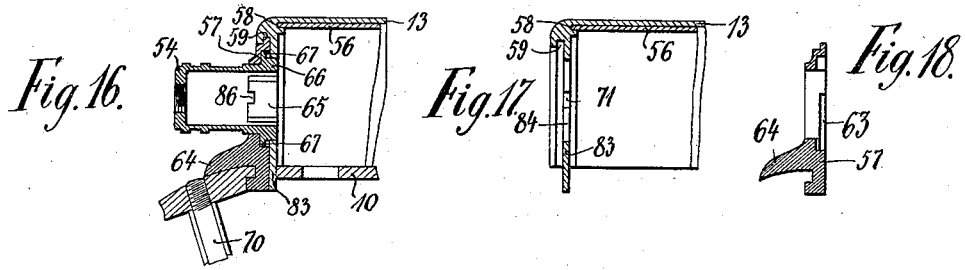
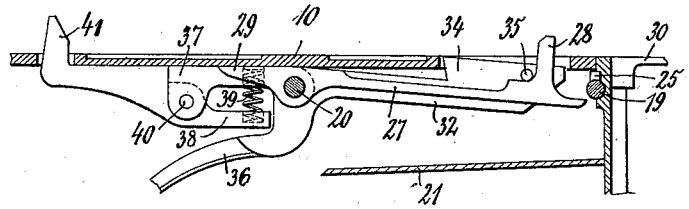
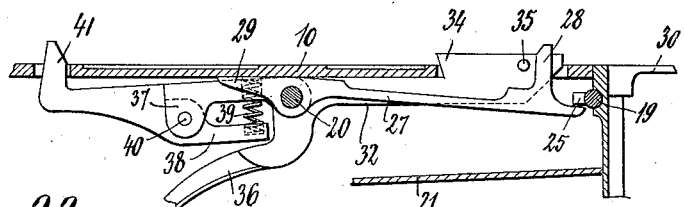
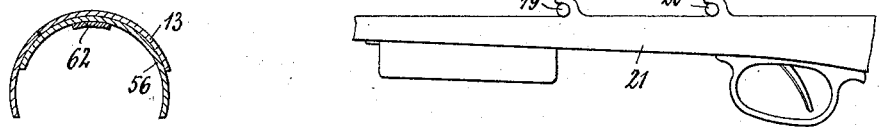
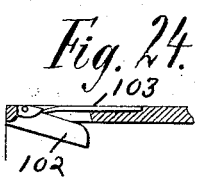
INVENTOR
Jens Theodor Suhr Schouboe
By Richards
ATTORNEYS
WITNESSES
H. M. Kuehne
John A. Percival No. 785,275. PATENTED MAR. 21, 1905.
J. T. S. SCHOUBOE.
SELF LOADING SMALL ARMS.
APPLICATION FILED JUNE 25, 1901.
5 SHEETS—SHEET 5.
Fig. 25.
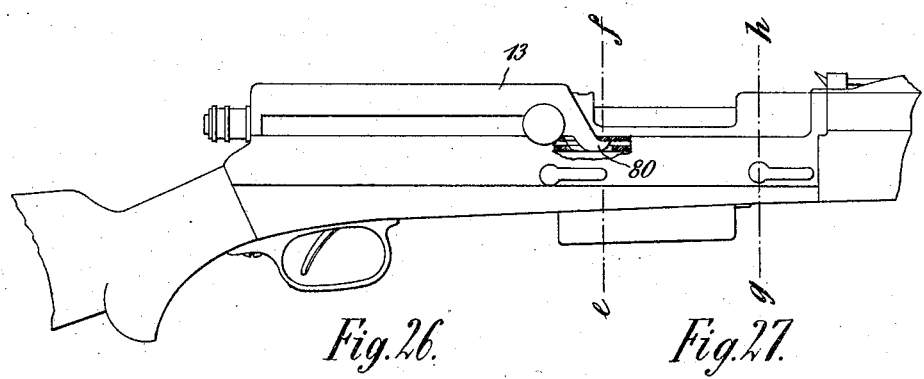
Fig. 26. Fig. 27.
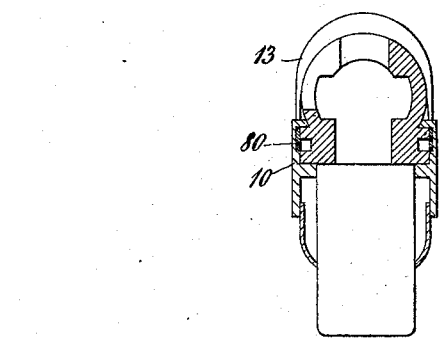 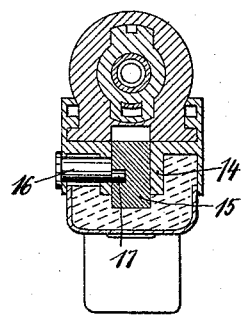
Fig. 29. Fig. 28. Fig. 30.
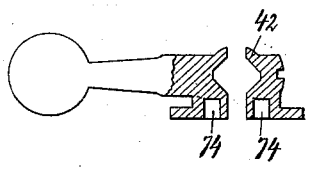 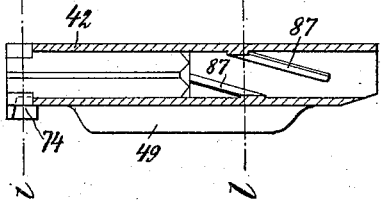 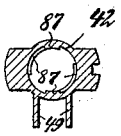
WITNESSES
W. M. Kiehne
Edmund Hanerck
INVENTOR
Jens Theodor Suhr Schouboe
BY Richards
ATTORNEYS No. 785,275. Patented March 21, 1905.

UNITED STATES PATENT OFFICE.

JENS THEODOR SUHR SCHOUBOE, OF COPENHAGEN, DENMARK.

SELF-LOADING SMALL-ARMS.

SPECIFICATION forming part of Letters Patent No. 785,275, dated March 21, 1905.

Application filed June 25, 1901. Serial No. 66,009.

*To all whom it may concern:*

Be it known that I, JENS THEODOR SUHR SCHOUBOE, first lieutenant, a subject of the King of Denmark, residing at Copenhagen, V Frederiksberg Allee 44, Denmark, have invented certain new and useful Improvements in Self-Loading Small-Arms, (for which I have applied for a patent in Belgium, France, and England, and which applications are dated April 1, 1901, April 4, 1901, and April 18, 1901,) of which the following is a specification.

This invention relates to that general class of small-arms in which the energy developed by the recoil of the gun when it is fired is stored up and utilized in extracting the empty cartridge-shell, introducing a new cartridge into the barrel, and cocking the hammer for the next discharge.

In order to aid in a more ready understanding of the detailed description of the construction and operation of the gun, which will hereinafter be given, a brief preliminary description of its organization will first be given.

My gun is provided with means for putting the recoil mechanism out of action, enabling the arm to be used as an ordinary single-loader, and, further, provided with a firing-tube and a percussion-spring, also acting as a locking-spring, as hereinafter explained, and, finally, provided with a breech-guard, with a locking-knob, and a special trigger device. The organization thus briefly outlined will now be described more in detail, reference being had to the accompanying drawings, in which—

Figure 1 represents partly my rifle in plan. Fig. 2 is a longitudinal central section taken through line $a\ b$ in Fig. 1, showing the breech mechanism and some of the adjacent parts in the position they occupy immediately after the rifle has been fired and before the recoil has taken place. Fig. 3 is a transverse vertical section of the breech and trigger mechanism and some of the adjacent parts, taken through line $c\ d$ in Fig. 2. Fig. 4 is a view of the trigger mechanism from the under side. Fig. 5 represents the breech-bolt. Fig. 6 represents the firing-pin with locking-knob. Fig. 7 represents the stop-plate. Fig. 8 is a longitudinal central section taken through line $b\ a$ in Fig. 1, showing the breech mechanism and some of the adjacent parts in the position they occupy when the recoil is terminated. Fig. 9 shows the rifle seen from the right-hand side. Fig. 10 represents the lock-cover seen from the right-hand side. Fig. 11 represents the nose of the breech-bolt. Fig. 12 is the locking-knob seen in front. Fig. 13 is a rear end view of the lock-cover. Fig. 14 is the rifle in plan with the mechanism drawn back. Fig. 15 is a longitudinal central section through Fig. 14. Fig. 16 is a longitudinal central section through the rear end of the lock-cover, showing the relation between this and the locking-knob and the loose stop-plate. Fig. 17 is a longitudinal central section through the rear end of the lock-cover. Fig. 18 is a section through the loose stop-plate. Fig. 19 shows the trigger mechanism seen from the right-hand side, showing the coöperative relations between the spring-block, the trigger-arm, and its plug. Fig. 20 shows the same as Fig. 19, and, further, the operative relation between the spring-block and the projection 25. Fig. 21 shows the connection between the trigger-plate and the frame. Fig. 22 shows the cross-section through the lock-cover, showing the position of the stop-lug on the inner wall. Fig. 23 shows the ejector seen from the right-hand side; Fig. 24, the same in plan. Fig. 25 shows a portion of the firearm seen from the side, partly in section. Fig. 26 is a section on the line $e\ f$ of Fig. 25. Fig. 27 is a section on the line $g\ h$ of Fig. 25. Fig. 28 is a longitudinal section through the handle-piece. Fig. 29 is a section on the line $i\ k$ of Fig. 28. Fig. 30 is a section on the line $l\ m$ of Fig. 28. Figs. 16 to 30 are represented in a larger scale than the other figures.

The front part of the barrel 1 is turned cylindrically, so that during the recoil it may slide in the outer tube 2. To secure the recoil-spring 3 to the barrel 1, there is provided upon the lower half of the barrel a foot 4, over which the head 5 of the spring 3 is passed.

In the rear of the barrel 1 a swallowtailshaped cavity for the barrel-holder 6 is provided. This latter is a flat spring with a swallowtailed foot 7, which is partly inserted into the above-mentioned cavity in the rear of the barrel and partly into a corresponding cavity in the barrel extension 22, by which means the barrel is prevented from turning round when being fired. The barrel-holder 6, which is also utilized to keep the cartridges down in the magazine during the last part of the recoil, (see Fig. 8,) is provided in front with a projection 8, which enters a recess in the barrel and is thereby prevented from slipping forward.

On the under side of the outer tube 2 a hook 100 is provided, on which the outer end of the recoil-spring 3 is secured.

The frame 10 is of H-shaped section and on the inside provided with ribs 11 and 12 for guiding the barrel extension 22 and the handle-piece 42, and in the uppermost of these holes are provided for the catches 80 of the breech-guard 13. In the bottom is a passage for the cartridges and behind this holes for the trigger-blocks 33, 34, and 41 and the stop-plate 57. In front of the cartridge-passage and below the frame a square block 14, extensions of which form a guide for the recoil-stopper is provided. This recoil-stopper consists of a square block 15, which is made to rise or fall by a bolt 16, in one end of which an eccentric plug 17 is provided, which grips the block, the other end being furnished with a small handle 18, (shown in Fig. 9,) which moves outside the right side face of the fixed frame, in which a hollow is cut out for the handle. If the handle 18 is pushed forward, as shown in Fig. 9, the block 15 is placed out of engagement with the barrel extension 22, and the recoil mechanism can consequently act, and if the handle 18 is pushed backward, as shown in Fig. 2 with broken lines, the block 15 is pushed up into the barrel extension, so that the latter is prevented from sliding back, by which means the recoil mechanism is put out of action, and the rifle may then be used as an ordinary single-loading rifle. During all drill the recoil mechanism should be cut off.

In the walls of the frame 10 holes are provided for the magazine-retaining bolt 19 and the trigger pivot-pin 20, and in the back of the frame is a socket for the rear stock-screw 70. The lower part of the frame 10 is closed by the trigger-plate 21, which is supplied with two pairs of catches 101, (see Fig. 21,) which (when the trigger-plate is pushed up between the walls of the frame and pressed forward) grip or hook over the bolts 19 and 20, which pass through the walls of the frame. The trigger-plate 21 has an opening for the magazine and the trigger and at the rear has a hole for the rear stock-screw. The outside of the barrel extension 22 at the rear is supplied with a chase 23 for the rib 11 in the frame 10. In the left side of the barrel extension is the ejector 102, (see Figs. 23 and 24,) which is an angle-lever of well-known construction, which is acted upon by a spring 103. In the rear of the barrel extension is an opening 72 for the cartridge-clip, from which cartridges are supplied to the magazine.

The inside of the magazine is of the usual pattern with magazine-spring 31 and carrier-plate 30. On the front corner is a projection 24, a recess in which engages with the bottom of the frames 10. In the back face of the magazine a horizontal semicircular groove is provided in which the bolt 19, having a cut-away portion, is disposed, which bolt may be turned by means of a handle 82 outside the frame. If it is desired to remove the magazine, the bolt 19 is given a half-turn, so that its cut-away portion turns toward the magazine, which can then be taken out, it being adapted to be turned downward at 24. To put the magazine on again, the projection 24 is first engaged with the bottom of the frame 10 by means of the recess. The bolt is held in such a manner that its flat side turns toward the magazine, and then the latter is pushed up into its place, and the round side of the bolt is turned into the groove in the back face of the magazine. The magazine is then fixed in position. Upon the bolt 19, which secures the magazine, there is also a projection 25, which when the handle upon the bolt is turned a quarter-turn upward, so that it comes opposite the handle 26 of the handle-piece 42, presses the spring-block 27 downward, so that the breech-bolt can be put back over the hook 28 without first pressing the trigger. This arrangement is made in order that an unfired cartridge may be removed from the chamber.

The trigger mechanism consists of the trigger, the catch, and the spring-block. The trigger, which turns on bolt 20, is a triple-armed lever. The forward arm 32 has in front a projection having two stops 33, (see Fig. 4,) a cocking-block 34, and on the side a pin 35. (See Figs. 19 and 20.) The stops prevent the breech-bolt from slipping back when the hammer is cocked. The cocking-block serves to cock the rifle and the pin to press down the spring-block 27. (See Fig. 19.) The lower arm 36 forms the trigger. The rear arm 37 is provided with an extension to carry the bolt 40 and a hole for the trigger-spring 39, one end of which acts against the bottom of the frame 10 and the other end against the forward arm 38 of the catch, which turns on the bolt 40, and thus at the same time tries to force the hooks 41 and the arm 32 upward. This last action, however, is limited by the bottom of the frame. The spring-block 27 consists of a double-armed lever secured by the bolt 20. The forward arm is a spring with a hook 28, the movement of which is partly dependent upon the trigger, and pin 35, secured to the arm 32, engages with the upper side of the spring-arm. The other arm, 29, presses against the bottom of the frame 10 in order to prevent the spring-block from turning on the bolt 20.

The spring-block lever prevents the breech-bolt from opening when it is once closed, as the hook 28 goes up behind one of the guide-ledges 48 of the handle-piece 42. When pressure is put upon the trigger, the hook is lowered by means of the pin 35 in such a manner that when the shot is fired the breech-bolt unimpeded can be moved back, and, as before stated, by the above-mentioned bolt 19 being turned a quarter-turn the spring-block 27 is pushed down, so that the breech-bolt can be freed without affecting the trigger.

The breech mechanism consists of the breech-bolt 43, the handle-piece 42, and the firing-tube 45 with the percussion-spring 44. The breech-bolt 43 is bored out inside cylindrically, with a bed for the firing-tube. Outside the forward end of the breech-bolt 43 is provided with two closing-blocks 47, in the left one of which provision is made for the extractor 46. On the back part of the nose of the breech-bolt, which is of somewhat smaller diameter than the forward part, are two screw-formed grooves 81, in which the two ribs 87, which are formed on the inner cylindrical part of the handle-piece 42, engage. The inner cylindrical part of the handle-piece ends behind in a square guide for the firing-tube. On the outside of the handle-piece 42 two ledges 48 are provided, which guide its passage into the frame 10, and below are two grooves 74 (see Fig. 5) for the hooks 41. Two ribs 49 are also provided on the handle-piece, which when the breech is closed and the uppermost cartridge is pushed into the chamber press the rest of the cartridges down in the magazine. The firing-tube 45 is a cylindrical tube which in front is closed and turned to a point. Behind it has a square guiding-piece 50, which moves in the square guide in the handle-piece, thereby preventing it from turning round. The guiding-piece 50 has on its top a safety-block 51 and underneath a cocking-block 52. On the back part of the firing-tube are two projections 53, which serve to hold the locking-knob 54 to the firing-tube when the mechanism is to be separated for cleaning. The percussion-spring 44 presses with its forward end against the base of the firing-tube and with its after end against the locking-knob 54. To guide that part of the spring which lies outside the firing-tube there is screwed into the base of the locking-knob a guide-pin 55, round which the spring is compressed when the breech recoils.

The breech-guard consists of an outer wall 13, a movable inner wall 56, a loose stop-plate 57, and the locking-knob 54. The outer wall 13 is furnished in front with two catches 80, which enter holes in the guide-rib 11, and inside there are bearings 58 for the movable inside wall 56. The outer wall has on its rear end an end wall 83, provided with a hollow 84 with two notches 71 for the locking-knob 54 and its lugs 67. At the end of the wall 13 a groove or seat 59 is provided to receive the upper edge of the loose stop-plate 57. (See Figs. 16, 17, and 18.) At the right-hand side the outer wall 13 is cut away at its lower edge to form a space 85 for the handle 26 of the handle-piece 42. This space can be closed by the inner wall 56, which latter is capable of turning in the bearings 58 inside the outer wall and can be moved by a little handle 61, projecting through a slot 60 in the outer wall 13. The inner wall has inside brazed on a knob 62, (see Fig. 22,) which when the inner wall is turned to the right, and thereby closes the opening for the handle 26, comes in front of the safety-block 51 of the firing-tube, and thereby prevents the latter from moving forward even when the trigger is pressed. The loose stop-plate 57 has in its center a circular hole for the locking-knob and also in its front surface two chases 63 with small recesses for the lugs 67 of the locking-knob. These lugs are pressed back by the pressure of the percussion-spring against the locking-knob, so that the latter is prevented from turning during firing. Further, below the locking-knob a foot with a heel 64 is provided, by the help of which it is secured to the frame 10. The locking-knob 54 is bored out cylindrically and ends behind in a base provided with a hole for the guide-pin 55. In the fore part of the recess are two ribs 65, in the back of which are beds 86 for the projections 53 of the firing-tube. On the outside the locking-knob is fitted with a flange 66, with two lugs 67, and with a milled handle-piece 68.

The stock is divided into two pieces. In the forward part of the stock a channel is cut out for the head 5 of the recoil-spring 3. It is fastened by means of the stock-ring and the trigger-plate 21, which when it is pushed forward to hook over bolts 19 and 20 slides over the back edge of the stock, which is prevented from slipping forward during firing by a stopper. The back part of the stock is pushed in between the tail end of the sliding frame and the trigger-guard and is held fast by the screw 70.

*The action.*—To load the rifle, the breech-block 43 and handle-piece 42 are pushed backward by the handle 26. The cartridge-carrier 30 goes up into the frame and prevents the bolt from coming forward. A cartridge-clip is then pressed in the opening 72 of the frame, and the cartridges are pressed down into the magazine with the thumb of the right hand. The clip is then pulled out of the breech with a sharp jerk, and the breech then closes automatically, in which closing action the uppermostcartridge is forced forward into the firing-chamber. The rifle is then ready for firing.

If it is desired to use the rifle as a single-loading rifle, the eccentric plug 17 will be raised to the position shown in Fig. 2 of the drawings, which represents the rifle used as a single-loader. When, however, it is desired to open the rifle to the magazine, this plug 17 will be lowered to the position shown in Fig. 8. By pressing upon the trigger 36 the arm 32 is turned downward and with it the cocking-block 34, so that the block 52 is set free, and the firing-tube 45 is forced forward by the spring 44 and the firing-pin at the end of the tube fires the cartridge in the usual manner. In the recoil the recoil mechanism, the firing mechanism, and the barrel 1 and its extension are all forced back together by the pressure of the liberated gas, (it being of course understood that the recoil-stopper 15 is in its lower position and not obstructing the passage of the parts in question.) By this action the recoil-springs and percussion-springs are compressed. The collective backward motion of the barrel, the barrel extension, and the breech is stopped by the head of the recoil-spring 3 pressing against the spring 73 in front of the frame. The firer's pressure upon the trigger causes the opening-hooks 41 to be lifted upward; but due to the angle at which the hooks are cut off the handle-piece will slide over them, pressing them downward, and when the backward motion is stopped and the barrel and breech-piece are again pressed forward by the springs the hooks 41 by the pressure of the spring 39 grip into the grooves 74 in the bottom of the handle-piece 42 and hold it back, while the barrel and the breech extension 22 are pushed forward by the recoil-spring. The breech-block 43 will follow the forward motion of the barrel extension by reason of the closing-blocks 47 gripping the breech-piece; but as the handle-piece is held fast by the hooks 41 the ribs which are in the inside of the handle-piece force the breech-block to turn as it goes forward until the locking-blocks enter the longitudinal grooves in the breech, by which means further turning is prevented. The breech-block will now, being held fast by the ribs in the handle-piece, slide out of the breech and take the cartridge-shell, which is held fast by the extractor 46, with it, and the ejector in the back end of the breech will during the continued forward motion of the breech strike against the base of the cartridge-shell, and so eject it. In consequence of the breech during the backward and forward motion sliding over the stop 33 the arm 32 of the trigger is forced downward and at the same time the opening-hooks 41 are forced upward, so that even if the firer lets go the trigger before the breech has regained its place the lock cannot free itself from the opening-hooks until this has taken place.

When the firer has let go the trigger, the foremost arm of the latter will in consequence of the trigger-spring's pressure be pushed upward. If the firer has let go the trigger before the breech has been pushed quite forwsrd, this movement will only take place when the breech is quite forward and does not press down upon the stops 33, and thereby force the opening-hooks 41 out of the grooves in the handle-piece, and the breech-block will then be pushed forward by the mainspring 44. During the movement the head of the breech-block pushes the uppermost cartridge into the chamber, while the ribs 49 force the others down into the magazine. The breech's movements take place so quickly that the firer cannot let go his grip of the trigger before the shell of the expended cartridge is ejected and the rifle loaded afresh and ready for firing. He will consequently be able to deliver, say, five shots which are in the magazine as quickly as he can press the trigger five times. On the other hand, by not immediately letting go the trigger—that is, without performing any special motion—he can regulate the speed with which the rifle acts.

Always after firing the safety-grip should be turned backward and the hammer let down, so that the breech and the barrel may not during drill or on the march collide with the trigger-head and possibly damage the latter.

When using the rifle as a single-loading rifle, as shown in Fig. 2, the barrel 1, spring 3, barrel-holder 6, and barrel extension 22 are stationary—that is, the block 17 prevents their movements while the rifle is being loaded.

What I claim is—

1. In a recoil-operated firearm, the combination with the rearwardly-sliding barrel, and barrel extension, of a tubular breech-bolt cooperating therewith, a hollow firing-pin, having its forward end located within the breech-bolt, a spring partly located within the hollow pin, and a handle-piece encircling the rear portion of the firing-pin and the breech-bolt and only connected with the latter by means of screw-formed grooves and ribs to effect a turning of the breech-block in the handle-piece, the turning being only limited by horizontal grooves in the barrel extension, substantially as described.

2. In a recoil-operated firearm, the combination with the sliding barrel, and tubular breech-bolt, of a hollow firing-pin, a stationary lock-cover, a second lock-cover within the same having circumferential movement, a rigid part closing the rear end of said stationary cover, a locking-knob carried by said rigid part, a guide-pin carried by said locking-knob in line with the hollow firing-pin, and a percussion-spring encircling said pin and projecting into the firing-pin, substantially as described.

3. In a recoil-operated firearm, the combination with the sliding barrel, breech-bolt, firing-pin and handle-piece, of trigger mechanism comprising a pivoted three-armed lever, one of said arms forming the trigger, stops and a cocking-block carried by one of the other arms, a rocking piece pivoted to the other arm having an upwardly-projecting hook, and a spring acting on said rocking piece, substantially as described.

In testimony whereof I have hereunto set my hand in the presence of two witnesses.

JENS THEODOR SUHR SCHOUBOE.

Witnesses:
A. RONTSEN,
J. C. JACOBSEN.